United States Patent Office

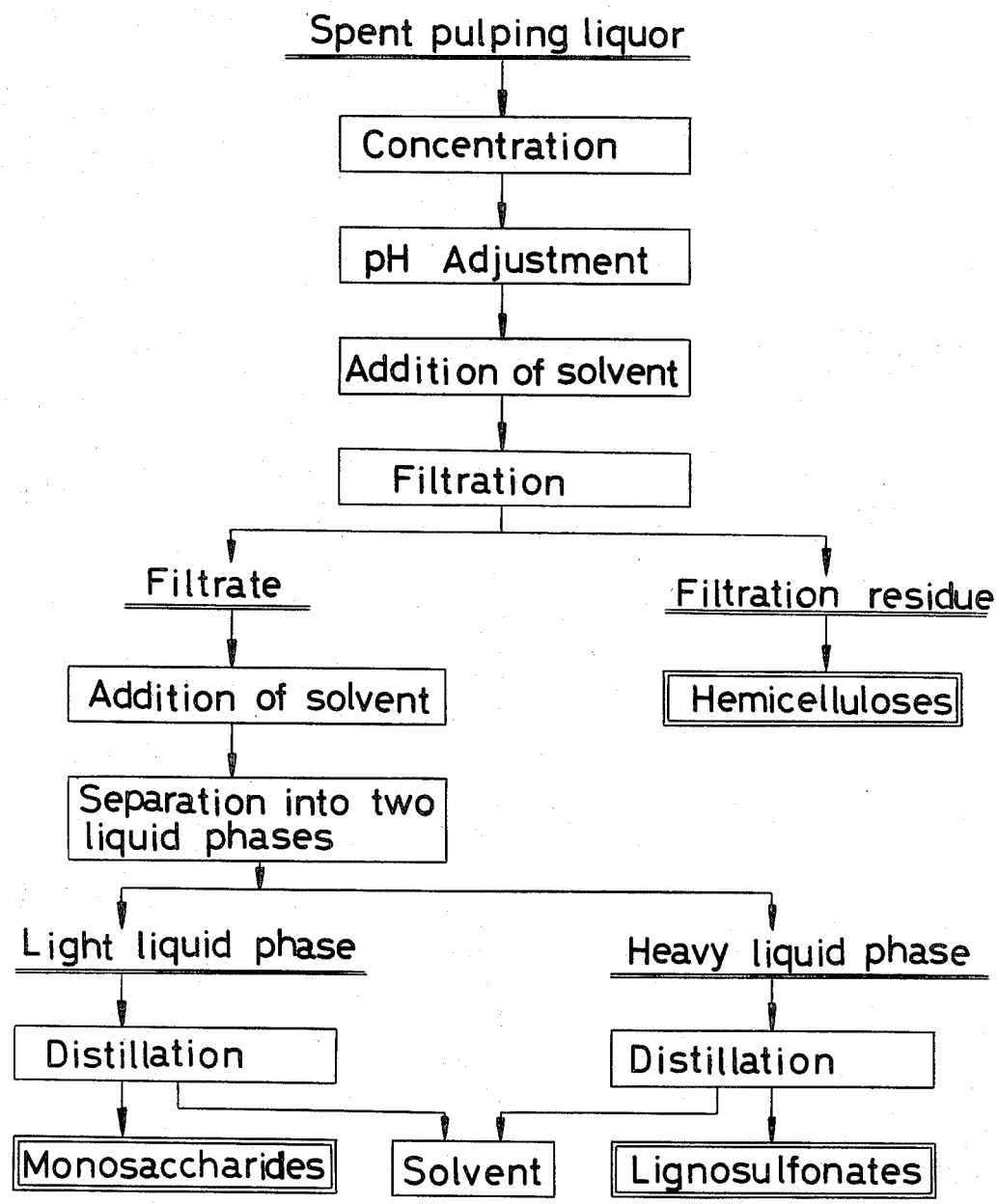

3,776,897
Patented Dec. 4, 1973

---

3,776,897
METHOD FOR TREATMENT OF SULFITE SPENT LIQUOR
Yoshikatsu Ikari, Chiba-ken, and Shoichiro Yokoyama, Tokyo, Japan, assignors to Agency of Industrial Science & Technology, Tokyo, Japan
Filed Aug. 2, 1972, Ser. No. 277,472
Claims priority, application Japan, Aug. 6, 1971, 46/58,967
Int. Cl. C07g *1/00*
U.S. Cl. 260—124 R         3 Claims

ABSTRACT OF THE DISCLOSURE

The pH of sulfite spent liquor to be treated is first adjusted to neutrality or weak acidity. To the resulting liquor is added a water-miscible organic solvent having a solubility parameter value of 9.0 to 12.5 in an amount such that the weight ratio of the solvent to water present in the spent liquor will fall in the range of from 6:4 to 4:6 thus causing hemicelluloses to be precipitated first. The hemicelluloses are removed from the liquor. Then, the organic solvent is added again to the residual liquor after the removal of hemicelluloses so as to cause formation of a heavy liquid phase containing lignosulfonates and a light liquid phase containing monosaccharides. The two phases thus formed are separated and refined to produce lignosulfonates and monosaccharides. The organic solvent used in the present treatment is recovered from the light liquid phase.

---

This invention relates to a method for the treatment of sulfite spent liquor to effect recovery of useful substances from the liquor. More particularly, this invention relates to a method for treating the sulfite spent liquor with an organic solvent thereby separating and recovering hemicelluloses, lignosulfonates and monosaccharides from the spent liquor in which they are contained.

Spent pulping liquor, particularly spent liquor resulting from the sulfite pulping operation using a sulfite as the digesting agent, contains various useful substances. These are lignosulfonates which are useful as water treating agents, dispersant, soil stabilizer and binder, hemicelluloses which are useful as starting materials for chemical and medical preparations, as filler for plastics and as water treating agents, and monosaccharides which are useful for the production of alcohols and yeast cells. To date, several methods have been proposed for the recovery of such useful substances from the spent pulping liquor. As methods for the recovery of organic components, for example, there are known Howard Process which causes the precipitation of lignin in the spent liquor by the use of lime and the Electrolytic Dialysis Process which divides the spent liquor by means of electrolytic dialysis into a fraction composed of digesting agent and water, a fraction of lignin, and a fraction composed of saccharides and low molecular acids. As methods directed to the recovery of inorganic salts, there are the Ion Exchange Process and the Concentration and Combustion Process. These methods invariably have a disadvantage in that they involve a complicated operation or that they require use of special equipment. Thus, they do not necessarily prove satisfactory from the standpoint of commercial operation. Besides, U.S. Pat. No. 3,337,366 discloses a method for extracting lignosulfonates and monosaccharides from the spent pulping liquor with a mixed solvent of acetone and methanol. However, since this method is mainly directed to recovery of monosaccharides, it is not suitable for the recovery of other useful substances, particularly hemicellulose. None of the existing methods, therefore, can be called a fully satisfactory means for the purpose of complete utilization of useful substances contained in the spent pulping liquor.

The principal object of the present invention is to provide an easy method for recovering, from sulfite spent liquor, hemicellulose contained in the said spent liquor and thereafter separating and recovering, from the residual liquor, lignosulfonates and monosaccharides independently of each other.

Another object of the present invention is to provide an economical method for recovering useful substances by subjecting the sulfite spent liquor to thorough treatment thereby ensuring it does not contribute to environmental pollution.

Other objects and other characteristic features of the present invention will become apparent from further description and preferred embodiments of the invention to be given hereinafter with reference to the accompanying drawing.

The drawing represents a flow sheet which illustrates one example of the process of treatment according to the present invention.

The inventors performed studies in search for a method enabling useful substances contained in spent pulping liquor, particularly spent liquor occurring in the sulfite pulp production, to be thoroughly separated and recovered from the spent liquor. As a consequence, they have learned that hemicelluloses, lignosulfonates and monosaccharides contained in the spent pulping liquor are easily separated from the liquor when the amount of the organic solvent which is added to the spent liquor is suitably selected. This knowledge has led to the accomplishment of the present invention.

Referring now to the drawing, the spent pulping liquor to be treated is first condensed as required to a prescribed concentration. Then, the pH of the liquor is adjusted to neutrality or weak acidity. The process of concentration and pH adjustment may, of course, be omitted when the spent pulping liquor already has the prescribed concentration and pH value. Precipitation of hemicelluloses occurs when a specific organic solvent is added in a prescribed amount to the spent pulping liquor which has undergone the said adjustment. The hemicelluloses are isolated by separating the precipitate through filtration and distilling the filtration residue. The filtrate is clearly divided into two phases, i.e., a light liquid phase and a heavy liquid phase, when the said specific organic solvent is added in a prescribed amount to the filtrate. When the two liquid phases are separated by a suitable known method and they are distilled independently, monosaccharides, inorganic salts and the greater part of the organic solvent used are recovered from the light liquid phase and lignosulfonates are obtained from the heavy liquid phase.

Any kind of sulfite spent liquor can be effectively treated by the method of this invention so far as it originates in a digesting agent using sulfurous acid or a salt thereof. It does not matter whether the pulp is from hardwood or angiospermwood or softwood or coniferous or gymnosperm. Examples of the spent pulping liquor usable for the present invention are those resulting from acid sulfite process, bisulfite process, weakly acid sulfite process, neutral sulfite process and multi-stage digestion process. These are sodium-based, ammonium-based, magnesium-based and calcium-based spent liquors. The present invention can effectively treat any one of these liquors. The method of the present invention is particularly suitable to spent liquors having high hemicellulose content.

For effective treatment by the method of the present invention, the concentration of solids which the spent pulping liquor contains is required to range from the low level of 8 to 15% to the high level of 50 to 60%, depending on the kind of spent liquor being used. From the economic point of view, the desirable range of solids content is generally from 25 to 40%.

The separation of useful substances contained in the spent pulping liquor deteriorates where the liquor is alkaline. If the liquor is acid, the sulfurous acid present in the liquor will react with the organic solvent to be incorporated afterward. As a precaution, it is necessary to adjust the pH of the spent pulping liquor in advance to neutrality or weak acidity. Many of the sulfite spent liquors of the kinds mentioned above are neutral or weakly acid from the beginning and, therefore, need not be subjected to such pH adjustment. They can be used in their unmodified state.

The organic solvent which is used as extraction solvent for the present invention is required to have a solubility parameter in the range between 9.0 and 12.5, preferably in the neighborhood of 10. It is also required to be miscible with water. The term "solubility parameter" as used here means the numerical value peculiar to each solvent proposed to be used as a measure of the solvent's solubility (see pp. 2–11, No. 1, vol. 8, of "I&EC Product Research and Development"). It is defined by the following formula:

$$\text{Solubility parameter } (S) = \sqrt{\Delta E/V}$$
$$= \sqrt{Ed/V + Ep/V + Eh/V}$$

In the formula, $\Delta E$ denotes the evaporation energy, $Ed$ the dispersing energy, $Ep$ the energy exerted between the two permanent dipoles, $Eh$ the energy of hydrogen bonding and V the molar volume of the solvent.

The organic solvents which are suitable for use in the method of the present invention include acetone (S=9.75) and methylethyl ketone (S=9.23) from the ketones, dioxane (S=10.0) and tetrahydrofuran (S=9.52) from the cyclic ethers, morpholine (S=10.52) and pyridine (S=10.61) from the nitrogen-containing compounds, dimethyl formamide (S=12.17) from the amides, and isopropyl alcohol (S=11.49), ethyl Cellosolve (S=11.88) and butyl Cellosolve (S=10.24) from the alcohols. Mixtures of these solvents with other solvents are also usable only if they have solubility parameter values in the range of between 9.0 and 12.5 and they are miscible with water. Examples of such mixture are a mixed solvent of dichloroethane (S=9.77) and ethyl alcohol (S=13.0) (dichloroethane/ethyl alcohol=2/1) and a mixed solvent of methyl alcohol (S=14.5) and acetone (S=9.75) (methyl alcohol/acetone=1/2). It is generally more advantageous for these solvents to have low boiling points so that they may easily be removed and recovered by distillation subsequent to phase separation.

Such organic solvents as ethyl ether (S=7.62), diisobutyl ketone (S=8.22) and methyl isobutyl ketone (S=8.21) which have low solubility parameter values fail to accomplish the required elution of hemicelluloses and the separation of the filtrate into two phases because they generally have low degrees of solubility in water. Ethanol (S=13.0), methanol (S=14.5) and other organic solvents which have high solubility parameter values do not bring forth the precipitation of hemicelluloses and the separation of two phases to any discernible extent, although they have high degrees of solubility in water and have capacity to acidify spent pulping liquors.

The addition of such solvent to the spent pulping liquor is carried out at two separate stages. For the first addition, the solvent is desirably in such an amount as to provide thorough elution of hemicelluloses contained in the spent liquor, though the amount is variable with the solids content of the spent liquor. Generally, this amount is such that the weight ratio of the solvent to the water present in the spent liquor falls in the range of between 6:4 and 4:6. Complete precipitation of hemicelluloses cannot be obtained when the amount of the organic solvent is smaller than the lower limit of the said range. If the amount exceeds the upper limit, however, lignosulfonates are eluted together with hemicelluloses to produce a coprecipitate thereof.

The hemicelluloses are precipitated within the spent pulping liquor when the organic solvent is added to the liquor. The second addition of the organic solvent is made to the filtrate which has resulted from the separation of hemicelluloses from the liquor through filtration. Upon addition of the solvent, the filtrate is separated into two phases, i.e., a light yellow light liquid phase and a viscous heavy liquid phase. The light liquid phase turns out to be the portion of the organic solvent which has monosaccharides, low-molecular compounds and inorganic salts dissolved therein. The heavy liquid phase contains lignosulfonates and a part of the organic solvent. When the light liquid phase and the heavy liquid phase are separated from each other and are distilled independently, the organic solvent is recovered and monosaccharides, low-molecular compounds and inorganic salts are obtained from the light liquid phase and lignosulfonates are obtained from the heavy liquid phase. These light liquid phase and heavy liquid phase may be used in their unmodified state, namely without distillation, to suit the purpose of use.

For the purpose of the second addition, the organic solvent is desirably in an amount such that the weight ratio of the solvent to water present in the filter will fall in the range of between 1:3 and 1:5. If the amount of the organic solvent is smaller than the lower limit, then the heavy liquid phase is gradually formed with lignosulfonates which will be eluted in the decreasing order of their molecular weights. It is, therefore, possible to obtain lignosulfonates of varying molecular weights by suitably adjusting the amount of the organic solvent to be added at this stage.

For the purpose of the present invention, these treatments can be performed satisfactorily at any reaction temperature falling within the range of from normal room temperature to the boiling point of the organic solvent to be used. Even in the case of an operation involving a large volume of spent pulping liquor, the required treatments can be carried out very easily because the reaction system need not be maintained at a specific temperature.

As mentioned above, the method of the present invention resides in adding a water-miscible organic solvent having a solubility parameter value of 9.0–12.5, at two separate stages of operation, to the spent pulping liquor which has in advance been adjusted in pH value to neutrality to weak acidity. The addition at the first stage results in the separation of hemicelluloses and the addition at the second stage permits practically thorough separation of monosaccharides, inorganic salts and lignosulfonates. Besides, the organic solvent used in the treatments can easily be recovered. Thus, the present invention proves highly advantageous from the economic standpoint.

The monosaccharides to be obtained by the method of this invention can be used for the production of methyl alcohol, yeast cells, nucleic acids and the like by suitable utilization of microorganisms. The lignosulfonates are used as binders, dispersants, soil reconditioners and surface active agents. In addition, they may be converted to vanillin by treatment with lime or caustic soda. Hemicelluloses have recently been drawing keen attention because of their usefulness as raw materials for chemical and medical preparations and as filler and water-treating agent.

The present invention is described in further detail with reference to preferred embodiments which will be cited hereinafter solely for illustration and not for limitation in any way.

EXAMPLE 1

To 50 ml. of a calcium-based acid sulfite spent liquor (solids concentration 10.6%, specific gravity 1.046 and pH 5.0) resulting from the pulping operation using wood of coniferous and gymnosperm trees, 150 ml. of acetone was added as the organic solvent. The resultant mixture was diluted with water to a total volume of 250 ml. In this case, the weight ratio of water to acetone was 45:55. When this mixture was agitated for some time at normal room temperature and then left to stand for five hours, there ensued formation of a precipitate. By separating this precipitate by filtration, there was obtained 13.2 mg. of hemicelluloses. This value corresponds to 2.4 wt. percent of the total organic substances present in the spent liquor. Thereafter, acetone was added, little by little, to the filtrate obtained after removal of the aforementioned precipitate until the weight ratio of water to acetone reached an approximate level of 25:75. While the addition was in progress, a viscous dark brown liquid was observed to sediment to the bottom. On completion of the addition of the prescribed amount of acetone, the resultant mixture was allowed to stand at rest. The mixture divided itself into a light yellow light liquid phase and a viscous dough-like heavy liquid phase. The two phases were separated from each other. When the light liquid phase was distilled, there was obtained 1.69 g. of monosaccharides corresponding to 63% glucose as reducing sugar. From the heavy liquid phase, there was obtained 3.48 g. of lignosulfonates having a purity of over 95%.

EXAMPLE 2

Fifty (50) ml. of calcium-based acid sulfite spent liquor (solids concentration 15.8%, specific gravity 1.067 and pH 5.2) resulting from the pulping operation using wood of hardwood and angiospermwood trees was treated by repeating the procedure of Example 1. In this case, the addition of acetone was made so that there was obtained a water-to-solvent weight ratio of 53:47. As the product of the first-stage addition of organic solvent, there was obtained an amount of hemicelluloses which corresponded to 5.0% of the total solids. The second addition of acetone was continued until there was obtained a water-to-solvent weight ratio of 25:75. Consequently, there were obtained a light liquid phase and a heavy liquid phase. The light liquid phase afforded 3.22 g. of sugar solution containing sugar corresponding to 54% reducing sugar and the heavy liquid phase gave a viscous liquid containing 4.80 g. of lignosulfonates.

EXAMPLE 3

Fifty (50) ml. of sodium-based neutral sulfite semichemical spent liquor (solids concentration 15.9%, pH 6.5, specific gravity 1.072) resulting from the chemical pulping operation using wood of hardwood and angiospermwood trees was treated by repeating the procedure of Example 1, excepting that three different organic solvents were used in the present operation.

(I) Isopropyl alcohol used as the organic solvent

The hemicelluloses contained in the spent liquor were eluted in a combined amount corresponding to 11.7% of the total solids of the liquor when isopropyl alcohol was added until there was obtained a water-to-solvent weight ratio of 53:47. The second addition of isopropyl alcohol was continued until there was obtained a water-to-solvent weight ratio of 12:88. As a consequence, there were formed a light liquid phase and a heavy liquid phase. The light liquid phase afforded a sugar solution containing saccharides and other components in a combined amount corresponding to 14.6% of the total solids and the heavy liquid phase gave a viscous liquid containing lignosulfonates in a combined amount corresponding to 73.7% of the total solids.

(II) Dioxane used as the organic solvent

The hemicelluloses contained in the spent liquor were eluted in a combined amount corresponding to 16.4% of the total solids of the liquor when dioxane was added until there was obtained a water-to-solvent weight ratio of 40:60. The second addition of dioxane was continued until there was obtained a water-to-solvent weight ratio of 9.5:50.5. Consequently, there ensued separation of the liquor into a light liquid phase and a heavy liquid phase. The light liquid phase afforded a sugar solution containing saccharides and other components in a combined amount corresponding to 9.9% of the total solids and the heavy liquid phase gave a viscous liquid containing lignosulfonates in a combined amount corresponding to 73.7% of the total solids.

(III) Tetrahydrofuran used as the organic solvent

The hemicelluloses contained in the spent liquor were eluted in a combined amount corresponding to 15.3% of the total solids of the liquor when tetrahydrofuran was added until there was obtained a water-to-solvent weight ratio of 49:51. The second addition of tetrahydrofuran was continued until there was obtained a water-to-solvent weight ratio of 19:81. As a consequence, there occurred separation of the liquor into a light liquid phase and a heavy liquid phase. The light liquid phase afforded a sugar solution containing saccharides and other components in a combined amount corresponding to 7.2% of the total solids and the heavy liquid phase gave a viscous liquid containing lignosulfonates in a combined amount corresponding to 77.5% of the total solids.

We claim:

1. A method for recovering organic components from a sulfite spent pulping liquor containing said organic components comprising adjusting the pH value of the spent liquor to neutrality or to weak acidity, adding to the pH-adjusted spent liquor a water-miscible organic solvent having a solubility parameter value of 9.0–12.5 in an amount to induce thorough precipitation of hemicelluloses present in the spent liquor, separating the precipitated hemicelluloses from the liquor, adding the same organic solvent to the residual liquor resulting from the separation of precipitated hemicelluloses thereby causing the liquor to be separated into a heavy liquid phase containing lignosulfonates and a light liquid phase containing monosaccharides, and isolating the two phases.

2. A method set forth in claim 1, wherein the amount of the organic solvent used for the first addition is such that the weight ratio of the organic solvent to water present in the spent liquor falls in the range of between 6:4 and 4:6.

3. A method set forth in claim 1, wherein the amount of the organic solvent used for the second addition is such that the weight ratio of the organic solvent to water present in the spent liquor falls in the range of between 1:3 and 1:5.

References Cited

FOREIGN PATENTS 561,643   8/1958   Canada _____ 260—124 R

LEWIS GOTTS, Primary Examiner

D. R. PHILLIPS, Assistant Examiner

U.S. Cl. X.R.

210—54; 260—209 R